Feb. 3, 1948.  J. MERCIER  2,435,546
SERVO SELECTOR VALVE
Filed Aug. 18, 1943  2 Sheets-Sheet 1
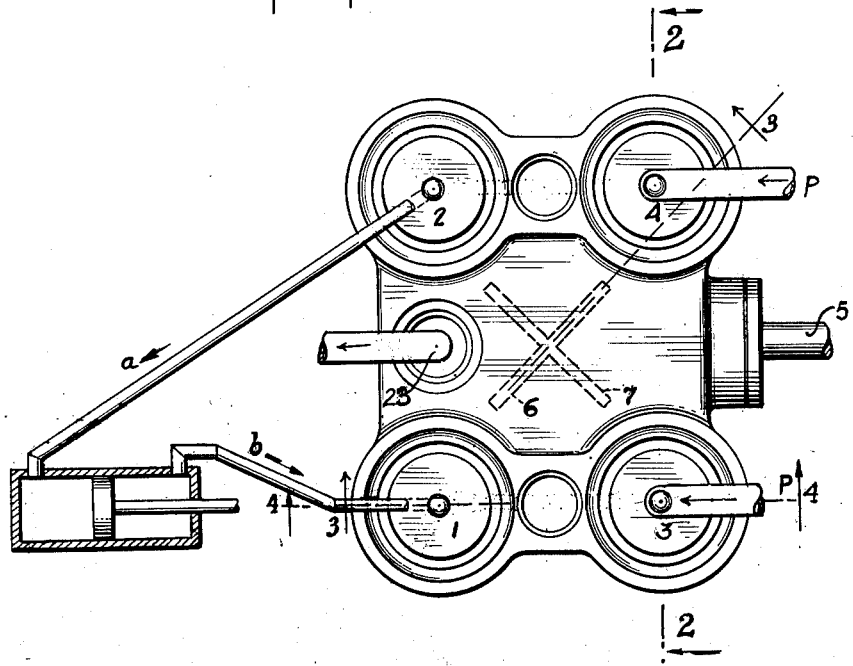
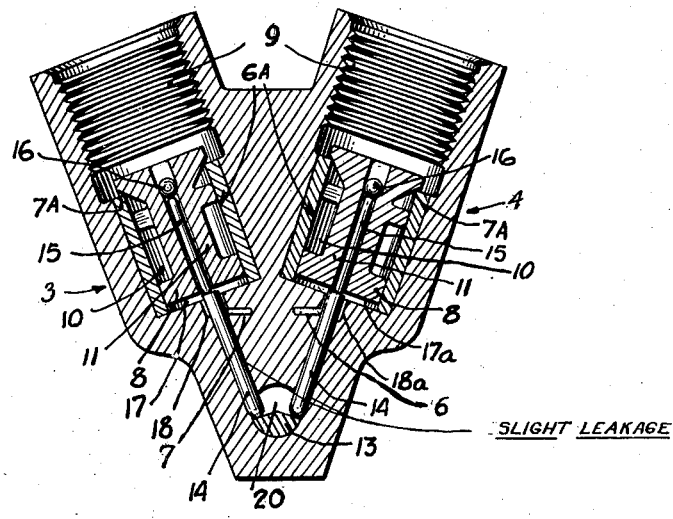
INVENTOR.
Jean Mercier
BY
Howard T. Jenkins
ATTORNEY

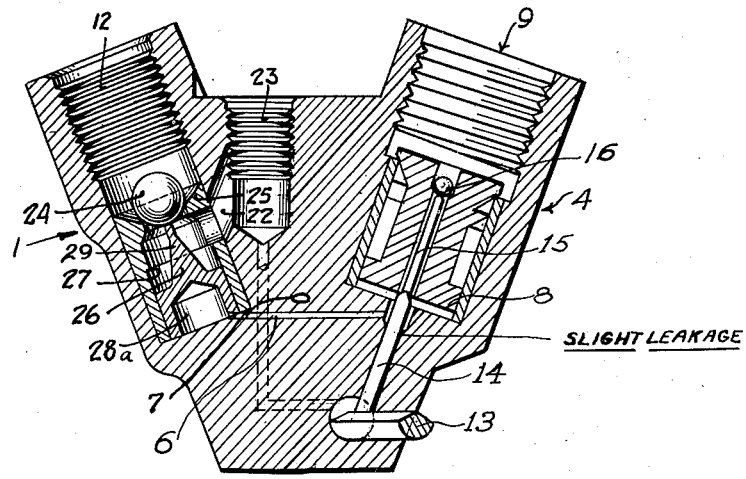
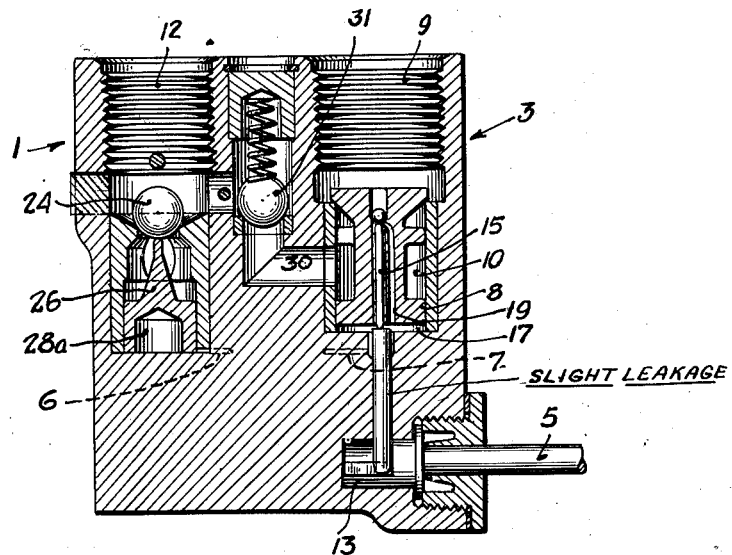

Patented Feb. 3, 1948

2,435,546

UNITED STATES PATENT OFFICE 2,435,546

SERVO SELECTOR VALVE

Jean Mercier, New York, N. Y.

Application August 18, 1943, Serial No. 499,073

1 Claim. (Cl. 137—144)

The present invention pertains to servo selector valves and more particularly to a selector valve unit used to control a double-acting hydraulic jack. An object of the present invention is to provide a selector valve unit to control a double-acting hydraulic jack which not only permits a rapid flow of fluid, but is comparatively easy to operate.

To that end the valve unit is composed of four individual valves; to wit, two pressure inlet and two return valves, respectively. Each pressure inlet valve is associated with one return valve so that opening of the pressure inlet valve will automatically produce the opening of the associated return valve.

In one feature of the present invention the pressure inlet valve is provided with a principal movable valve element which is subjected to fluid pressure across a large cross sectional area. There is also provided an auxiliary valve element of comparatively small cross sectional dimensions which is associated with each principal valve element to control the passage extending throughout the latter. The communication through this passage is controlled from the outside. When the auxiliary element is lifted the principal element will be subjected on the large and small end faces to fluid pressure and will thus be displaced with ease.

According to a further feature of the present invention each of the return valves also includes a principal movable valve element associated with an auxiliary valve element. Each said auxiliary element includes a chamber and when fluid pressure is admitted to either of said chambers the corresponding auxiliary valve element will engage and displace the principal valve element with which it is associated.

Finally, each one of the chambers formed in the auxiliary valve elements of the return valves may be connected to the space in one of the pressure inlet valves surrounding that end face thereof which is not subjected to fluid pressure except when the valve is opened. Accordingly, if pressure is being admitted to the said space by an operation of the auxiliary valve element of the pressure inlet valve, then the same pressure will be admitted into one of the aforesaid chambers so that the corresponding auxiliary valve element will open the associated return valve.

Further features of the present invention will become apparent from the following description of embodiments given by way of example and illustrated in the accompanying drawings.

Fig. 1 is a top view of the selector valve unit according to the present invention, including a diagrammatic flow chart illustrating the valve unit and the jack to be operated;

Fig. 2 is a section along line 2—2 of Fig. 1;

Fig. 3 is a section along line 3—3 of Fig. 1;

Fig. 4 is a section along line 4—4 of Fig. 1.

In Fig. 1 numerals 1 and 2 designate the two fluid outlet valves and 3 and 4 are the two fluid inlet valves. Numeral 5 indicates the shaft of an operating cam.

If shaft 5 is turned to one side, pressure inlet valve 4 and outlet valve 1 will be opened while the other valves are closed, and fluid will circulate in the direction of arrows a and b. If shaft 5 is turned to the other side, valves 1 and 4 will be closed, while valves 2 and 3 are opened, whereby fluid will flow in an opposite direction to the arrows. In the neutral position of shaft 5 all valves are closed.

Dotted lines 6 and 7 designate two conduits within the valve casing, conduit 6 connecting valves 1 and 4 and conduit 7 connecting valves 2 and 3 in a manner to be explained below in connection with Figs. 3 and 4.

Fig. 2 shows in section the two pressure inlet valves 3 and 4. Each valve includes a cylinder bore 6A, a valve seat 7A and a principal movable valve element 8. Ports 9 are connected to a source of fluid pressure and chambers 10 formed by the wall of bore 6A and a recessed portion 11 of element 8 are connected to two ports 12, shown in Figs. 3 and 4, which serve alternatingly as pressure and return ports. Valves 3 and 4 are actuated by a cam 13 which can be operated from the outside by means of shaft 5, Figs. 1 and 4. Cam 13 engages pins 14 which in turn engage pins 15 in the passages extending through the valve casing and element 8. In the neutral position auxiliary valve elements (balls) 16 close the passages holding pins 15, but when cam 13 is rotated one way or the other, one of the balls 16 will be lifted. Fluid will pass along one of the loosely fitting pins 15 and accumulate either in spaces 17 and 18 or 17a and 18a, respectively.

Further rotation of cam 13 will cause element 8 to be lifted from seat 7A and fluid will be admitted to chamber 10, and thus to the port 12. Since the pressure on both end faces of element 8 is substantially the same, then the only force that is necessary to overcome is the force resulting from the difference in the cross sectional area of the said two faces. By varying the aforesaid difference the valve can be adjusted to open and close more or less easily.

The clearance between pin 14 and the passage accommodating the same must be large enough to vent spaces 17 and 17a, 18 and 18a within a reasonable time after cam 13 is returned to neutral position so that element 8 will return to seat 7a. On the other hand, the clearance between pins 15 and the passages holding the same must so far exceed that between pins 14 and the passage corresponding to them, that the desired accumulation of fluid under pressure can take place in spaces 17, 18, or 17a, 18a. Thus it is desirable, in some cases, to provide an additional passage 19 (Fig. 4) extending from a point just below ball 16 to spaces 17 and 17a.

Bore 20 accommodating cam 13 is connected to the return port of the valve unit, thus allowing the fluid which passes around the pins 14 to pass to the return line.

The outlet valves, one of which is shown in Figures 3 and 4, are adapted to communicate by means of ports 12 with the jack to be actuated, and through ports 22 with the outlet port 23 of the valve unit. The passage of fluid between ports 12 and 23 is obstructed when the principal valve elements (balls) 24 are applied against their seats 25. The piston like auxiliary valve elements 26 are, each, slidably carried in a cylinder bore 27 provided in the casing of each return valve. In the illustrated embodiment, the diameter of seat 25 must be smaller than that of bore 27. Elements 26 include chambers 28a formed in their base portions, and a projection 29 adapted to engage the co-acting element 24.

Chamber 28a (Fig. 3), located in valve 1, communicates through conduit 6 with space 18a of valve 4 and chamber 28a (valve 2) is connected through conduit 7 with space 18a of valve 3.

Accordingly, when cam 13 is turned to operate valve 3 or 4 fluid pressure will enter chamber 28a or 28 and, since the area of elements 28a on which the pressure acts, is greater than that of elements 24 on which the pressure is acting, one of the outlet valves will be opened.

Fig. 4 shows valves 1 and 3, in which the chambers 10 are connected by passages 30 to ports 12 and which, accordingly, function alternatingly as pressure outlet and as return ports. A check valve 31 prevents any back flow of fluid into chambers 10.

The foregoing description is not intended to limit the present invention which extends to all changes, modifications and equivalents within the scope of the appended claim.

What is claimed is:

A four-way hydraulic valve having two inlet ports, two system ports and an outlet port, a pair of primary valves each for connecting one of the inlet ports to one of the system ports, a pair of secondary valves each for connecting one of the system ports to the outlet port, each of said primary valves being biased to closed position by fluid pressure in the inlet port and having fluid pressure responsive means for balancing said inlet pressure, a pilot valve associated with each of the primary valves to admit pressure fluid from the inlet port to the fluid pressure responsive means and to slowly exhaust said fluid to said outlet port, means to selectively operate said pilot valves, means to utilize the balancing pressure from a pilot valve to open a secondary valve, and means to actuate the primary valve associated with the operated pilot valve to admit pressure fluid to one of the system ports while fluid is being exhausted from the other system port through the secondary valve opened by the pressure fluid from the said operated pilot valve.

JEAN MERCIER.

REFERENCES CITED

The following references are of record in the file of this patent:

UNITED STATES PATENTS

| Number | Name | Date |
| --- | --- | --- |
| 1,956,775 | Ross | May 1, 1934 |
| 2,321,267 | Van der Werff | June 8, 1943 |
| 1,277,427 | Knauf | Sept. 3, 1918 |
| 1,955,154 | Temple | Apr. 17, 1934 |
| 2,286,880 | Traut | June 16, 1942 |
| 1,080,000 | Citroen | Dec. 2, 1913 |

FOREIGN PATENTS

| Number | Country | Date |
| --- | --- | --- |
| 334,651 | Great Britain | Sept. 11, 1930 |